(12) United States Patent
Maali et al.

(10) Patent No.: US 9,652,860 B1
(45) Date of Patent: May 16, 2017

(54) SYSTEM AND METHOD FOR AUTONOMOUS PTZ TRACKING OF AERIAL TARGETS

(71) Applicant: PureTech Systems, Inc., Phoenix, AZ (US)

(72) Inventors: Fereydoun Maali, Scottsdale, AZ (US); Dilip Swaminathan, Irvine, CA (US); Marvin Wade Barnes, Glendale, AZ (US); Travis A. Woodrow, Tucson, AZ (US)

( * ) Notice: Subject to any disclaimer, the term of this patent is extended or adjusted under 35 U.S.C. 154(b) by 0 days.

(21) Appl. No.: 15/180,133

(22) Filed: Jun. 13, 2016

Related U.S. Application Data

(63) Continuation-in-part of application No. 14/938,506, filed on Nov. 11, 2015, now Pat. No. 9,367,748, which is a continuation of application No. 14/569,785, filed on Dec. 14, 2014, now Pat. No. 9,213,904, which is a continuation-in-part of application No. 14/215,475, filed on Mar. 17, 2014, now Pat. No. 8,929,603.

(60) Provisional application No. 61/793,891, filed on Mar. 15, 2013.

(51) Int. Cl.
| | |
|---|---|
| G06K 9/00 | (2006.01) |
| G06T 7/20 | (2017.01) |
| G06K 9/52 | (2006.01) |
| G06K 9/62 | (2006.01) |
| G06T 7/00 | (2017.01) |
| G06K 9/46 | (2006.01) |
| G06T 7/60 | (2017.01) |
| G06T 3/40 | (2006.01) |

(52) U.S. Cl.
CPC ........ *G06T 7/2033* (2013.01); *G06K 9/00335* (2013.01); *G06K 9/4604* (2013.01); *G06K 9/4661* (2013.01); *G06K 9/52* (2013.01); *G06K 9/6215* (2013.01); *G06K 9/6267* (2013.01); *G06T 3/40* (2013.01); *G06T 7/0042* (2013.01); *G06T 7/0085* (2013.01); *G06T 7/60* (2013.01)

(58) Field of Classification Search
CPC ............................ G06T 7/60; G06T 7/2033
See application file for complete search history.

(56) References Cited

U.S. PATENT DOCUMENTS

| | | | | |
|---|---|---|---|---|
| 2003/0091228 A1* | 5/2003 | Nagaoka | ............ | G06K 9/00651 382/154 |
| 2013/0251194 A1* | 9/2013 | Schamp | ............ | G06T 7/0081 382/103 |
| 2014/0240466 A1* | 8/2014 | Holz | ............ | G06T 7/004 348/47 |
| 2016/0203371 A1* | 7/2016 | Tyagi | ............ | G06K 9/00771 382/103 |
| 2016/0232411 A1* | 8/2016 | Krishnamoorthy | ..... | G06T 17/05 |

\* cited by examiner

*Primary Examiner* — Oneal R Mistry
(74) *Attorney, Agent, or Firm* — Thomas W. Galvani, P.C.; Thomas W. Galvani

(57) ABSTRACT

A system for autonomous tracking of aerial targets in real space. The imaging means captures and aligns first and second images. A normalized correlation operation initiates a process for producing a resultant image including blobs corresponding to elements in the real space, despite the presence of a homogenous aerial background. One of the blobs is analyzed, classified, and tracked as a target.

4 Claims, 10 Drawing Sheets

Resultant Image,
Binary Blobs

Resultant Image,
Outlines of Dilated
Blobs, with Centroids
from Center of Field
of View Second Image,
Outlines of Dilated
Grayscale Blobs

SYSTEM AND METHOD FOR AUTONOMOUS PTZ TRACKING OF AERIAL TARGETS

CROSS-REFERENCE TO RELATED APPLICATIONS

This application is a continuation-in-part of pending U.S. application Ser. No. 14/938,506, filed Nov. 11, 2015, which was a continuation of U.S. application Ser. No. 14/569,785, filed Dec. 14, 2014, which was a continuation-in-part of U.S. application Ser. No. 14/215,475, filed Mar. 17, 2014, which claimed the benefit of U.S. Provisional Application No. 61/793,891, filed Mar. 15, 2013, all of which are hereby incorporated by reference.

FIELD OF THE INVENTION

The present invention relates generally to imaging, and more particularly to video surveillance imaging analysis systems and methods.

BACKGROUND OF THE INVENTION

The usefulness of video surveillance systems is becoming increasingly acknowledged as the demand for enhanced safety has increased. Areas commonly covered by such systems, include, for example, monitoring of harbors, airports, bridges, power plants, parking garages, public spaces, and other high-value assets. Traditionally, such camera networks require a labor-intensive deployment and monitoring by human security personnel. Human-monitored systems are, in general, relatively costly and prone to human error. For these reasons, the development of technology to automate the deployment, calibration, and monitoring of such systems has become increasingly important in the field of video surveillance.

For example, in automated video surveillance of sensitive infrastructures, it is always desirable to detect and alarm in the event of intrusion. To perform such a task reliably, it is often helpful to classify and track detected objects in an effort to discern from their actions and movements whether they pose an actual threat. Detecting and tracking an object are not easy tasks, however. Those functions require powerful video analytics and complex algorithms supporting those analytics. This often requires determining which portions of a video or image sequence are background and which are foreground, and then detecting the object in the foreground. Object detection is further complicated when the camera imaging the target moves, either because it is mounted to something which is mobile or because the camera is monitoring a wide field of view by a step-and-stare method of camera movement. Autonomous lock-on-target tracking fills an ever-important requirement in video surveillance of critical infrastructures where a preferred target is continually monitored without interruption until it is attended to in commensurate with the prevailing security policy. In comparison to tracking with fixed video cameras, autonomous lock-on-target tracking offers the advantage of extending the camera field of view without compromising desired resolution, through re-orientation of the camera and resort to appropriate magnification.

Other difficulties exist. Generally, video surveillance systems are unable to determine the actual size of an object, which can make threat detection even more difficult. With actual size detection, benign objects can be better differentiated from real threats. Moreover, the kinematics of an object, such as its velocity and acceleration (from which momentum can be estimated), are much more difficult to analyze when real size is unknown. Additionally, geo-referencing demands the existence of landmark-rich scenes which may not be available in many instances, such as in the surveillance of the ports, harbors, airspace, or when a site is being remotely—and perhaps covertly—monitored, and it is not feasible to introduce synthetic landmarks into the scene. An improved system and method for tracking a target is needed.

SUMMARY OF THE INVENTION

According to the principle of the invention, a system and method for autonomous lock-on target tracking includes providing a real imaging means forming a pair of first and second images of a real aerial space in a field of view of the imaging means, the field of view having a center, storing the pair of first and second images in non-transitory memory, and then performing, with a processor, a correlation operation on the pair of first and second images so as to form a resultant image including blobs corresponding to elements in the real aerial space. The resultant image is stored in the non-transitory memory. One of the blobs is classified as the object, and the system and method track the object by moving the imaging means toward the object by an amount corresponding to the distance between the center of the field of view and a center of the object. The tracking step is continually repeated as the element corresponding to the object moves in the real aerial space.

BRIEF DESCRIPTION OF THE DRAWINGS

Referring to the drawings.

DETAILED DESCRIPTION

Figure 1:
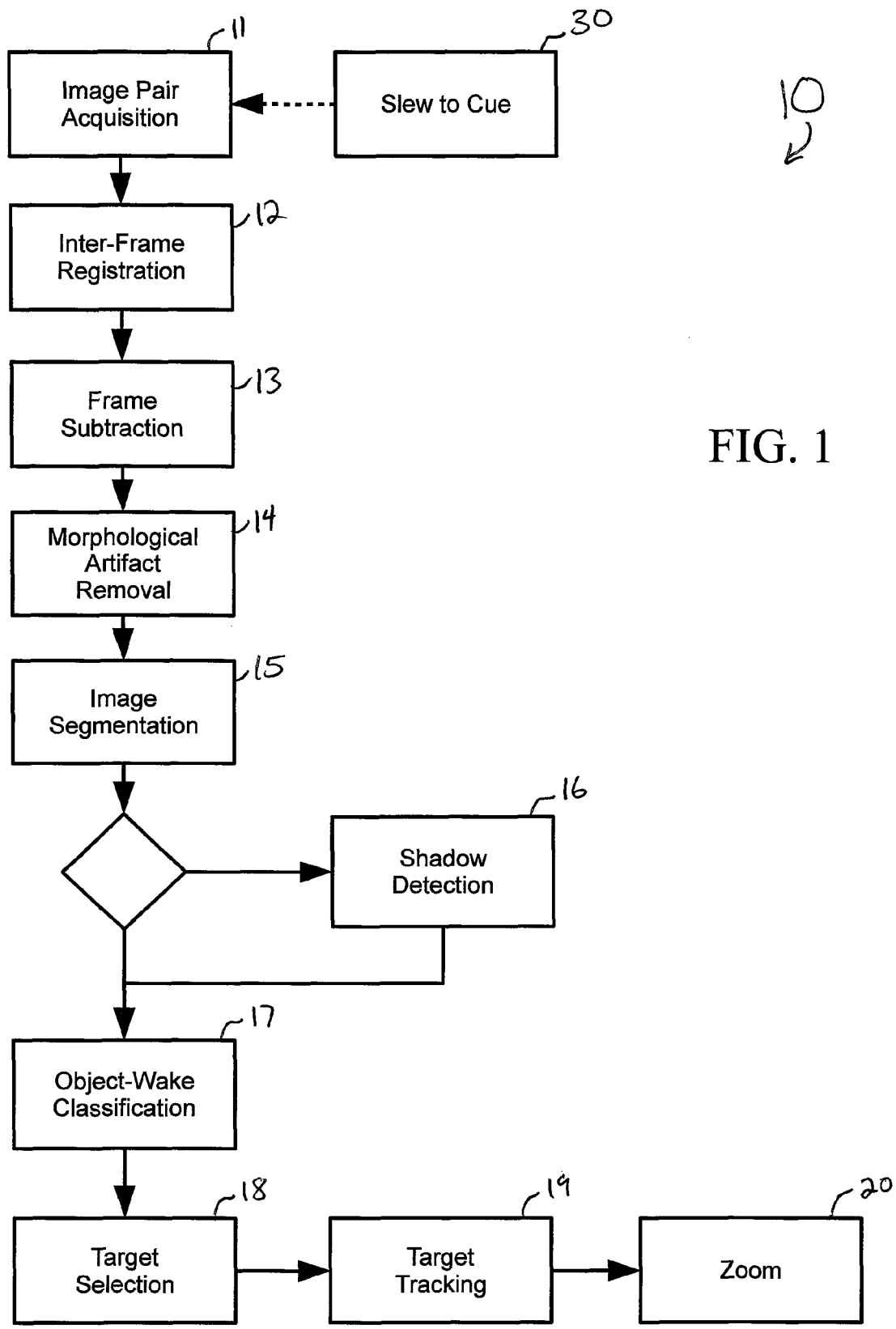
FIG. 1 is a flow diagram showing steps of an autonomous lock-on target tracking process with geo-spatial aware PTZ cameras according to the present invention.

Reference now is made to the drawings, in which the same reference characters are used throughout the different figures to designate the same elements. FIG. 1 illustrates the principal stages of a process 10 for imaging, analyzing, and tracking an object through terrain space. The process 10 is carried out with a system including an imaging means, such as a PTZ video camera capable of panning, tilting, and zooming through the terrain or real space from a location. In other embodiments, the imaging means is a lidar, radar, sonar, thermal, phase array, ultrasound or sonogram imaging means, or other real imaging means that includes a physical device for capturing information about real space. The various figures, however, illustrate an exemplary imaging means as a PTZ camera. The PTZ camera is mounted to the location but is capable of panning, tilting, and zooming with respect to that mounted location. In a first step 11 of the process, an image pair is acquired.

In the image pair acquisition step 11, the camera records video of the terrain space in a field of view of the camera, along with all of the elements in the terrain space in that field of view, which may include the ground, water, people, a single person, animals, trees, boats, etc. As the term is used here, "element" will refer to a potential target in terrain space. The camera records video at a specific frame rate, which is capped by the manufacturer's specifications and the hardware capabilities of the camera, often around 30 to 100 frames per second. Frames are generally recorded, or captured, as quickly as the camera can operate. The camera is coupled in communication—either wired communication or wireless communication—to a central computer with a processor, and memory in the form of a hard disk and random access memory ("RAM"), which form a part of the system operating the process 10.

The camera records and stores a first frame, which will also be termed a first image. The camera is coupled in data communication with a computer or server having a non-transitory computer readable medium, such as storage memory, RAM, processor cache, hard drive memory, flash drive memory, or the like, and the images are transmitted to the computer as an electronic communication for storage in the storage memory. The computer includes a processor, which is programmed with an algorithm running all of the operational steps described herein. The computer preferably stores all frames to RAM, or whichever non-transitory memory allows for fastest access in the particular environment. The camera then records and the computer stores a subsequent frame, herein termed a second image, which may be the next frame or a later frame. The first and second images are not necessarily sequential, and often will be separated by several frames. Preferably, the user defines a maximum number of frames beyond which a subsequent frame will not be recorded as the second image, but rather, the system will record and store a new first image and a new second image. The first and second images together are identified herein as an image pair.

Once the first and second images have been stored as an image pair, the system performs the next step 12 of inter-frame registration, which stabilizes and aligns the images. As a prerequisite for inter-frame registration, elements in the terrain space which may be later identified as objects or targets (as will be explained) should occupy only a small portion of the field of view of the camera. The installer or operator of the system can meet this prerequisite by installing the system so that the field of view encompasses a large area with respect to an element to be detected as a potential target. For instance, if the system is installed in a harbor for detecting boats, the camera should be installed a sufficient distance and height away from the water so that a boat could not occupy a large portion of the camera's field of view. In another example, if the system is installed at a border crossing for monitoring numbers on license plates of moving vehicles, then the camera should be installed a sufficient distance and height away from the license plates so that the numbers do not occupy the entire field of view, but are still at least sufficiently large that they can be detected, even through a range of camera zoom levels.

Alignment of the first and second images of the image pair is performed through a normalized correlation of the first and second images relying on all of the elements in the field of view. Image alignment is understood in the art and will not be explained in detail here. Essentially, the first and second images are overlaid and translated vertically and horizontally with respect to each other toward a maximum value until there is parity between the first and second images. Once the first and second images are aligned, that alignment is maintained later during various operations performed on the first and second images.

The system next proceeds to a frame subtraction or differencing step 13 in which a differencing operation is performed between the first and second images of the image pair to reveal blobs in the image pair. Blobs are clusters of foreground pixels which correspond to moving elements in the terrain space. Moving elements become foreground blobs, because the differencing option eliminates elements which do not move and are therefore considered to be only background. Blobs are later more specifically identified as objects or wakes, as will be explained.

Every pixel in the first and second images has a grayscale property which is a function of additional properties of illumination and reflectiveness of the actual element in the terrain space, assuming that the element has a diffused surface. Briefly, it is noted that the term "grayscale" is synonymous with "intensity" in the context of this invention. Grayscale has a particular meaning when used in the context of an image illuminated in visible light. Despite this, the term grayscale is used without limitation to that particular meaning because it is used as a substitute for intensity, which term is applicable in a broad range of the electromagentic spectrum, including visible and infrared light. The term grayscale is used here because the examples given herein are more clearly understood in the context of the visible light spectrum. The properties of grayscale and reflectiveness are exploited in image subtraction to reveal the blobs. The following equations define image subtraction and determine high and low thresholds which are used to limit the classification of pixels as foreground pixels.

$$\log_b g_t - \log_b g_{(t-1)} = \log_b L_t - \log_b L_{(t-1)} \tag{1},$$

where b is a user-defined base for the logarithm function, g is the grayscale value, $L_t$ is the illumination, the subscript or suffix t indicates the current frame, or second image, and the suffix t−1 indicates the previous frame, or first image. This analysis is performed over an overlapping region of the first and second frames, such that the pixels which are subjected to equation (1) exist in both the first and second images.

Next, a change in illumination of all the pixels in the overlapping region is determined according to:

$$\delta L = |\text{Mean}\{\log g_t\} - \text{Mean}\{\log g_{(t-1)}\}| \tag{2}$$

That change in illumination is used to determine high and low thresholds, according to:

$$D_h = \delta L \times T_1 + T_2 \quad (3),$$

$$D_{lo} = \delta L \times T_1 \quad (4),$$

where $T_1$ and $T_2$ are user-defined parameters.

For a pixel in the overlapping region to qualify as a foreground pixel, it must satisfy the following pixel-to-neighborhood differencing requirements. First, the grayscale for each pixel in the overlapping region in the first image must deviate from a corresponding pixel in the second image by at least $D_h$ to qualify as a foreground pixel. Second, the grayscale of that pixel in the first image must also deviate from each adjacent pixel to the corresponding pixel in the second image by at least $D_h$. Third, the grayscale for each pixel in the overlapping region in the second image must deviate from each adjacent pixel to the corresponding pixel in the first image by at least $D_{lo}$. If the pixel meets each of these requirements, it is properly classified as foreground and thus may be part of a blob, and the image containing the foreground blob or blobs, which is a binary image, is defined identified herein as a "resultant image." Blobs are clusters of pixels in the resultant image which correspond to clustered foreground pixels in the overlapping region of the first and second images.

A morphological artifact removal operation is next performed in step 14 of the process 10. The operation removes singular, or small clusters of foreground pixels, as such pixels are attributed to noise and are unlikely to correspond to a potential target. There are several methods for morphological artifact removal, as the process for revealing blobs is conventional, well-known in the art, and need not be discussed further.

Next, the system performs an image segmentation step 15 in the process 10 which is intended to group and define clusters of foreground pixels into blobs, separating the blobs from background pixels and also from each other. Image segmentation essentially defines a blob as a single, continuous bounded region for easy identification and analysis later. There are several methods for image segmentation, as the process for revealing blobs is conventional, well-known in the art, and need not be discussed further.

A shadow detection or suppression step 16 is next optionally performed. Shadow detection is used to ensure that the centroid of a blob is as close as possible to the true centroid of the blob corresponding to the real element, when the shadow is actually attached to the element and both are present in the field of view of the camera. Because the element in terrain space will cast a shadow, and because that shadow will be attached to or contiguous with the object itself, the object and the shadow will together be defined as a single blob during the image segmentation step 15. This will create error in the determination of the location of the centroid of the blob. Shadow detection reduces that error by discarding portions of the blob which correspond to the shadow cast by the element.

The shadow detection step 16 is performed when the target has a width-to-height ratio which is greater than a user-defined threshold and when the target has no more than a user-defined compactness threshold. Where the requirements of the width-to-height ratio and compactness are met, the system performs shadow detection. Where the requirements are not met, or where the user has chosen not to employ shadow detection, the process 10 proceeds to the object-wake classification step 17.

Figure 2A:
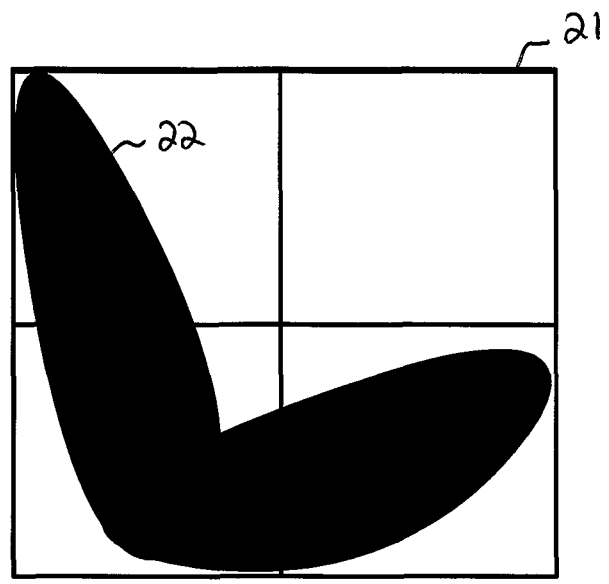
FIGS. 2A and 2B are generalized diagrams illustrating a portion of an embodiment of the shadow detection step in the process of FIG. 1.
Figure 2B:
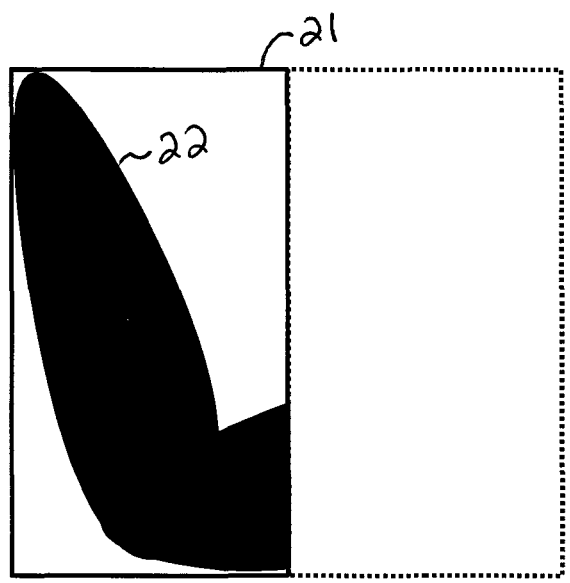

FIGS. 2A and 2B generally illustrate the shadow detection step 16. Shadow detection is performed on the resultant image, which is a binary image consisting of zeros and ones. First, a bounding box 21 is drawn around a blob 22 and is divided into four quadrants, as in FIG. 2A. Column-sum processing is performed according to:

$$\vec{CS} = [cs_1 \ldots cs_N]^T \quad (5),$$

where $cs_j = \sum_{i=t}^{M} a_{ij}; j=1 \ldots N$

A maximum column-sum ratio for an upper-left quadrant is determined with equation (5), and a maximum column-sum ratio for the upper-right quadrant is determined with equation (5). Then, a maximum column-sum ratio for the left half of the bounding box is determined with equation (5), and a maximum column-sum ratio for the right half of the bounding box is determined with the equation (5).

The bounding box 21 is then pared down to the portion of the blob 22 corresponding to the object. This is done by first comparing the maximum column-sum ratio for the upper-left quadrant to a user-defined threshold. If the maximum column-sum ratio for the upper-left quadrant exceeds that threshold, then the pixels of the right half of the bounding box 21 are discarded, or discounted, along with those pixels corresponding to the blob 22 due to the element, as in FIG. 2B. If the maximum column-sum ratio for the upper-left quadrant does not exceed that threshold, then the maximum column-sum ratio for the upper right quadrant is compared to the user-defined threshold. If the maximum column-sum ratio for the upper-right quadrant exceeds that threshold, then the pixels of the left half of the bounding box are discarded, or discounted, along with those pixels corresponding to the blob 22 due to the element. The shadow detection step 16 above may performed in successive iterations to further trim the shadow.

Figure 3A:
FIGS. 3A-3C are generalized diagrams illustrating a portion of an embodiment of the object-wake classification step in the process of FIG. 1.
Figure 3B:
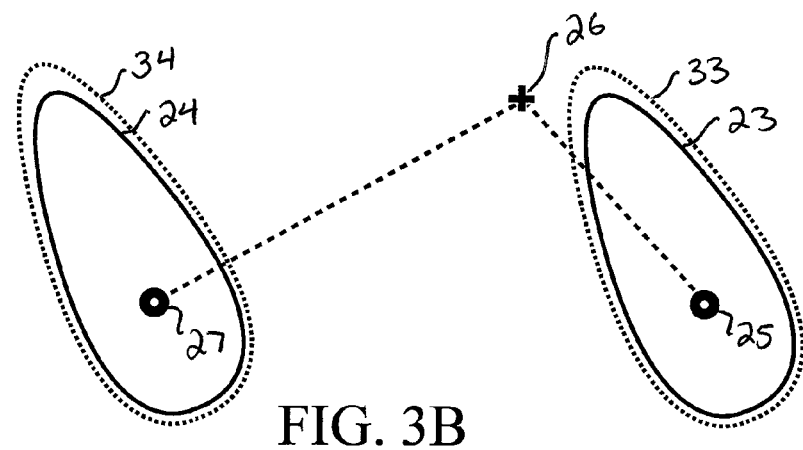
Figure 3C:

Next in the process 10 is the object-wake classification step 17, whose purpose is to classify blobs into one of either objects or wakes. FIGS. 3A-3C illustrate generally some of the operations of the object-wake classification step 17. An object is a blob associated with the second image, while a wake is a blob associated with the first image. In other words, an object is a blob which corresponds to the position of the actual element (likely a potential target) currently, while the wake is a blob which corresponds to the position in which the element was previously.

A blob is classified as either an object or a wake after a series of operations is performed on the resultant image and the image pair. Different operations are performed depending on the nature of the blob or blobs in the overlapping region, and depending on the desired sophistication of the system. In one method, the system quickly and easily defines the object as the blob which has a centroid which is closest to the center of the resultant image. This is done merely by calculating and comparing the distances between the center and the centroids of the blobs. Alternatively, in a more robust application of the system, a set of operations is performed which determines which blob is the object. These operations rely on comparisons of the grayscales of different areas of the second image of the image pair, and how those areas relate to the blobs in the resultant image. This application of the system proceeds below, with reference to FIGS. 3A-3C. FIG. 3A shows the resultant image and two blobs 23 and 24 which remain as binary images from the foreground, contrasted against a binary background, shown in FIG. 3A as a white background. Object-wake classification then proceeds according to the following steps:

1. Close and distant blobs are identified in the resultant image based on the blobs' centroids. The centroid is the geometric center, or center of mass, of a blob. Determining the centroid of any bounded region on a plot is a conventional and well-known task which need not be explained to one having ordinary skill in the art. Once the centroid for each blob is determined, the distances of all of the centroids to the center of the field of view of the camera are compared, and the blob with the centroid closest to the center of the resultant image is located and defined as a "close blob," while the other blob is defined as a "distant blob." As shown in FIG. 3B, the blob 23 is the close blob, because the distance between its centroid 25 and a center 26 of the field of view is smaller than the distance between the centroid 27 of the blob 24, which is the distant blob. It should be noted that FIG. 3B shows only the outlines of the blobs 23 and 24 for clarity of the illustration, but blobs 23 and 24 are binary images.

2. A dilation operation is performed on the resultant image, resulting in the close blob 23 and the distant blob 24 transforming into a dilated close blob 33 and a dilated distant blob 34, each of which is slightly enlarged in the resultant image, as indicated by the broken outline of the dilated close and distant blobs 33 and 34 in FIG. 3B.

3. Certain pixels in areas of the second image are analyzed and their grayscale values are compared. More specifically, pixels in the second image which correspond in location to the pixels that make up the close blob in the resultant image are determined and identified as "close pixels" 43. Likewise, pixels in the second image which correspond in location to the pixels that make up the dilated close blob in the resultant image are determined and identified as "dilated close pixels" 53. FIG. 3C illustrates the close pixels 43 and the dilated close pixels 53 with solid and broken outlines, respectively, bounding the close pixels 43 and the dilated close pixels 53. Again, the close pixels 43 and dilated close pixels 53 exist in the second image of the image pair, and as such, have grayscale values.

4. A first dissimilarity comparison is performed on the divergence of the grayscale of the close pixels 43 and the dilated close pixels 53 and is assigned to the variable $D_c$, according to:

$$D_c = \lceil |D(p,q)|, |D(q,p)| \rceil \quad (8),$$

where $\lceil A,B \rceil$ is known as a ceiling function outputting the greater of A and B, p corresponds to the distribution of the grayscale in the close pixels 43, q corresponds the distribution of the grayscale in the dilated close pixels 53, and $D(p,q)$ and $D(q,p)$, which are similar to Kulback-Liebler ("KL") divergences, are determined according to:

$$D(p, q) = \sum_{k=0}^{K-1} p_k \log_2\left(\frac{p_k}{q_k}\right), \quad (9)$$

and $$D(q, p) = \sum_{k=0}^{K-1} q_k \log_2\left(\frac{q_k}{p_k}\right) \quad (10)$$

5. Equation (8) returns $D_c$, which is a dissimilarity measure for the close blob 23.

6. Steps 3 and 4 are then repeated, but for the distant blob 24. More specifically, pixels in the second image which correspond in location to the pixels that make up the distant blob 24 in the resultant image are determined and identified as "distant pixels" 44. Likewise, pixels in the second image which correspond in location to the pixels that make up the dilated distant blob 34 in the resultant image are determined and identified as "dilated distant pixels" 54. The distant pixels 44 and dilated distant pixels 54 exist in the second image of the image pair, and as such, have grayscale values.

7. A second dissimilarity comparison is performed on the divergence of the grayscale of the distant pixels 44 and dilated distant pixels 54, and assigned to the variable $D_d$, according to:

$$D_d = \lceil |D(p',q')|, |D(q',p')| \rceil \quad (11),$$

where $\lceil A,B \rceil$ is known as a ceiling function outputting the greater of A and B, p' corresponds to the distant pixels 44, q' corresponds to the dilated distant pixels 54, and $D(p',q')$ and $D(q',p')$, which are similar to Kulback-Liebler ("KL") divergences, are determined according to:

$$D(p', q') = \sum_{k=0}^{K-1} p'_k \log_2\left(\frac{p'_k}{q'_k}\right), \quad (12)$$

and $$D(q', p') = \sum_{k=0}^{K-1} q'_k \log_2\left(\frac{q'_k}{p'_k}\right) \quad (13)$$

8. Equation (11) returns $D_d$, which is a dissimilarity measure for the distant blob 24.

9. Finally, $D_c$ is compared to $D_d$, and if $D_c$ is greater, than the close blob 23 is defined as the object and the distant blob 24 is assigned as the wake. Conversely, if $D_d$ is greater, than the distant blob 24 is defined as the object and the close blob 23 is assigned as the wake.

The process 10 next proceeds to a target selection step 18. Target selection identifies a particular blob as the potential target, so that the system 10 knows which blob to track. As described above, the object is discerned from the blobs in the object-wake classification step 17. The target selection step 21 identifies and selects the object as a target. The target is then tracked autonomously by the PTZ camera of the system.

Once the target is selected, the target is tracked in step 19 of the process 10. Tracking is a responsive function following the target versus a predictive function estimating where the target will next move. The center of the field of view of the camera is also the image center. The distance between the centroid of the target and the image center is defined as an error distance, since the centroid is likely not disposed over the center of the image but is instead likely offset from the center by the error distance. The camera must be instructed to move so as to eliminate or close the error distance. The error distance has i and j components. The i and j components are standard notations used in a left-handed coordinate system, where i indicates a vertical location and j indicates a lateral location. The i and j components of the centroid are found, and once they are found, the error distance is decomposed into $\delta_i$ and $\delta_j$ components.

The error distance is then physically closed by moving the camera. The system instructs the camera to begin movement at pan and tilt speeds, according to:

$$\omega_\pi = \frac{\Omega_\pi}{1+e^{-\kappa(|\delta_j|-v_j)}}, \quad (14)$$

$$\omega_\tau = \frac{\Omega_\tau}{1+e^{-\kappa(|\delta_i|-v_i)}} \quad (15)$$

where $\omega_\pi$ signifies angular pan speed for the camera, $\Omega_\pi$ signifies a user-selected maximum angular pan speed for the camera, $\omega_\tau$ signifies angular tilt speed for the camera, $\Omega_\tau$ signifies a user-selected maximum angular tilt speed for the camera, $\kappa$ is a user-defined coefficient, and $v_i$ and $v_j$ are also user-defined coefficients. The speeds $\omega_\pi$ and $\omega_\tau$ are thus stimulus for correcting the error distance at a given time. However, it takes time for the camera to move to close the error distance, and during that time, the target may have moved as well. Therefore, during movement of the camera, and probably before the camera has eliminated the error distance, the target is likely to have moved and the system will have determined a new centroid and a new error distance to that centroid. This represents a feedback loop, through which the speed and direction of the camera is continually updated as the target moves, according to the above equations.

A zoom step 20 is entered when the target's blob has a low number of pixels because it is either small or distant. The zoom step is entered when the number of pixels is below a user-defined size threshold. The size threshold is set by the user based on the application. For example, where the terrain space is being monitored for a number of potential intrusions, the smallest potential target (perhaps a human walker) dictates the threshold. In that example, where a human walker is the smallest potential target, the size threshold may be set at a relatively small number of pixels, such as five or ten pixels.

Given the size threshold, an optimal zoom level $Z_O$ is determined, at which the camera operates until it receives other information. The optimal zoom level $Z_O$ is calculated according to:

$$Z_O = \frac{W}{2f_w}\cot\left(\frac{Nw_t}{2nR}\right), \quad (16)$$

where W is the width of the camera sensor or detector, $f_w$ is the minimum focal length of the camera, N is the width of the image in pixels, $w_t$ is the width of the target in meters, n is the width of the target in pixels, and R is the range to the target in meters. It is noted that equation (16) is useful when exploiting width as the critical dimension for comparison, but that height could be analogously exploited instead of width, with corresponding changes made to equation (16), when the height is more likely to be the limiting factor. Width is a handy dimension when humans are monitored, for example, because most humans are upright and have widths within a relatively well-defined range, while they may vary significantly in height.

Changing the camera's zoom level is a time-intensive activity because it relies on the relatively slow movement of mechanical parts within the camera, so the system preferably avoids frequent or unnecessary zoom changes. As such, the system has methodology to prevent unnecessary changes. The optimal zoom having already been determined from equation (16) is compared with an alternate optimal zoom. When the optimal zoom and the alternate optimal zoom agree, the camera changes its zoom level, but when the optimal zoom and alternate optimal zoom disagree, the camera does not change its zoom level. The optimal zoom and alternate optimal zoom are defined as agreeing when either they are identical to each other or they diverge by an amount less than a user-defined discrepancy, which accounts and allows for minor disagreement. Despite the user-defined discrepancy, a special case of disagreement is defined where the optimal zoom and the alternate optimal zoom disagree in sign, i.e., one is positive and one is negative, even if the optimal zoom and alternate optimal zoom diverge by an amount less than the user-defined discrepancy. The alternate optimal zoom level is:

$$\tilde{Z}_O = \frac{W}{2f_w}\cot\left(\frac{Nw_t\sin\theta}{2nh_c}\right), \quad (17)$$

where $\theta$ is the tilt of the camera with respect to horizontal, and $h_c$ is the height of the camera.

Once the zoom level is determined by comparison of the optimal zoom and the alternate optimal zoom, sets of discrete ranges for preferred, discrete zoom levels are determined which place a plurality of intermediate upper and lower zoom level stops on the zoom level for the camera throughout the entire zoom level range of the camera. The upper zoom level stop is defined by the following equation, which uses a ceiling equation that takes the greater of two values:

$$Z_U = \lceil 1, Z_O - Q \rceil \quad (18)$$

The lower zoom level stop is defined by the following equation, which uses a floor equation that takes the lesser of two values:

$$Z_L = \lfloor Z_O + Q, Z_{max} \rfloor \quad (19),$$

where $Z_{max}$ is the maximum zoom level for the camera at its telephoto end, and Q is:

$$Q = f(Z_O) = \frac{Q_{max}}{1+e^{-(\alpha Z_O - \beta)}}, \quad (20)$$

where $Q_{max}$ is a user-defined parameter, $\alpha$ is a user-defined parameter defining the growth rate of the sigmoid curve, and $\beta$ is lateral shift of the sigmoid curve along the $Z_O$ axis.

Because changing the camera's zoom level is a time-intensive activity, the upper and lower zoom level stops are used to save time. When the camera has a current zoom level between the upper and lower zoom level stops and is instructed to zoom in or out, instead of zooming to a particular or incremental zoom level between the upper and lower zoom level stops, the camera will instead zoom only to the upper or lower zoom level stop. For instance, if the camera is zooming in, instead of zooming in to some incremental zoom level, it will move directly to the upper zoom level stop. In this way, a great deal of time is avoided from constant and minute zoom wandering.

In an embodiment of the present invention, the process 10 for imaging, analyzing, and tracking an element through terrain space is extended to determine the real size, location, and speed of an element in terrain space. This is helpful to discern true threats from false threats such as nuisance alarms. For instance, a dog walking through the terrain space may be considered a target because, if the dog is close to the camera, it will appear large, and much larger than a human sneaking towards an ammunition depot much further from the camera. Determining the actual size of the dog informs the system that the dog is not a threat, and the system can then determine the actual size of the human and classify him as a threat. Additionally, an external cue, such as another camera, radar, a guard, or the like may cue the system to direct the camera toward a potential target. The methodology allowing this also allows the process 10 to be extended to cameras mounted on mobile platforms, such as automated guide vehicle (AGVs), unmanned waterborne vessels, high speed trains, mobile phones, and the like.

The methodology is made possible by georeferencing the camera to produce equations for rays in three-space emanating from the camera, with each ray being associated with a camera pixel coordinate when the camera has a specified attitude or orientation. Then, as the camera moves because of either movement of the camera platform or changes in pan, tilt, or zoom, those equations are correspondingly transformed to reflect the camera's new location, attitude, and zoom. The camera location is continually determined and monitored by a GPS system carried on board, and the attitude of the camera is likewise continually determined and monitored by both vertical gyros and course gyros (or MEMS or AHRS equivalents thereof). This allows the system to have knowledge of both the camera's location and attitude at all times. This knowledge, together with a digital elevation map of the terrain space stored in system memory, allows the system to correspond the pixels of the image of the terrain space with the resolution cells of the camera, and hence, infer the size of the real element in the terrain space.

The camera has geo-spatial awareness, which means that the system is aware of the camera's location and attitude or orientation within the terrain space, and the system derives equations for the rays emanating from the camera onto the terrain for the zoom level the camera is currently set at. It is noted that the information for creating geo-spatial awareness may be established during a calibration process, typically performed during initial installation or after a change in location of the camera.

Preferably, the digital elevation map for the terrain space over the entire area of operation, such as an entire rail line or an entire harbor space for example, is stored on board, and in other cases the digital elevation map is incrementally downloaded as the camera moves. The system performs an intersection of the transformed equations of the rays emanating from the camera with the digital elevation map to determine the points in the terrain space to which each pixel of the camera correspond, which allows the system to relate the pixels during movement of the camera. When the pixels are related to the resolution cells in the camera, the real size, velocity, and acceleration of the element in the terrain space can be determined. Momentum of the element is estimated from these kinematic figures. From the real size, velocity, and acceleration, the system classifies the target as a threat depending on the real size of the element.

Employing georeferencing with the process is helpful because it enables persistent tracking of the intended target. When the target is the only element in the field of view of the camera, and the target emerges from behind the barrier, the camera will track to the target as described above. However, when the target is one of two elements in the field and the target becomes obscured, the camera will track to the other element. With georeferencing, the system determines the real size, velocity, and acceleration of the other element, notes that the real size, velocity, and acceleration are different from that of the target, and ignores the other element. In this way, the system persists in tracking the same target despite the presence of other moving or obscuring objects that may move through or near the center of the field of view.

Figure 4A:
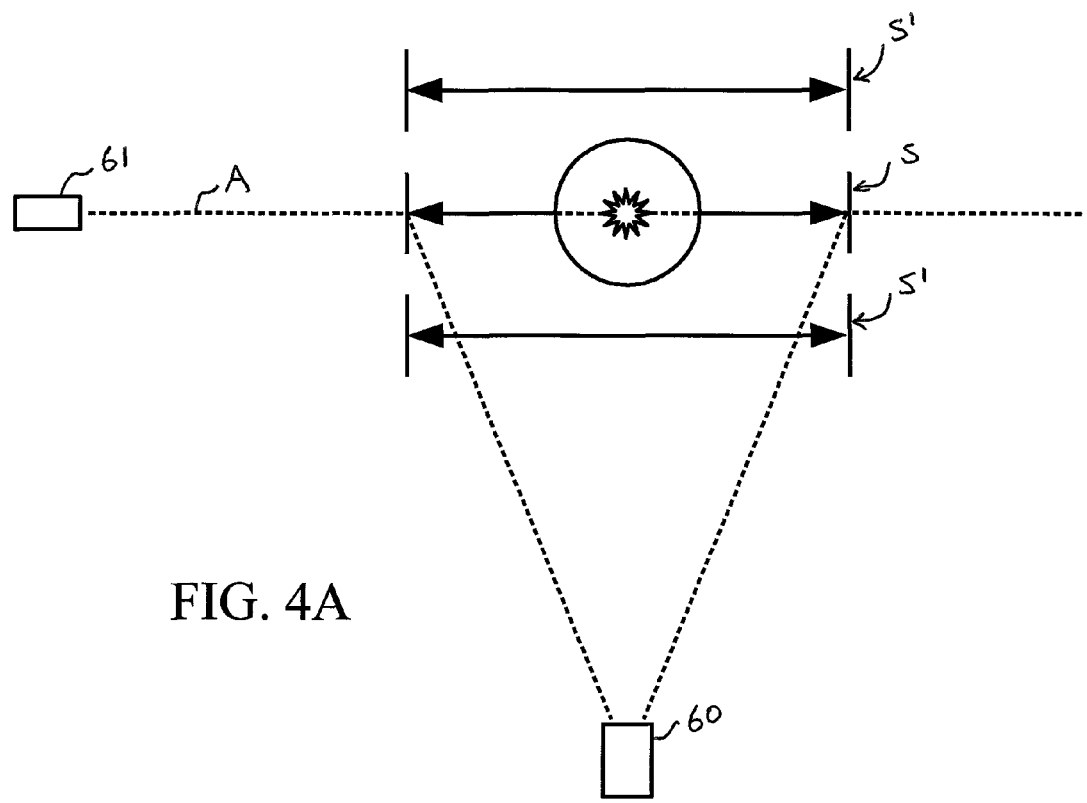
FIGS. 4A and 4B are generalized diagrams illustrating a slew-to-cue functionality of the process of FIG. 1.
Figure 4B:
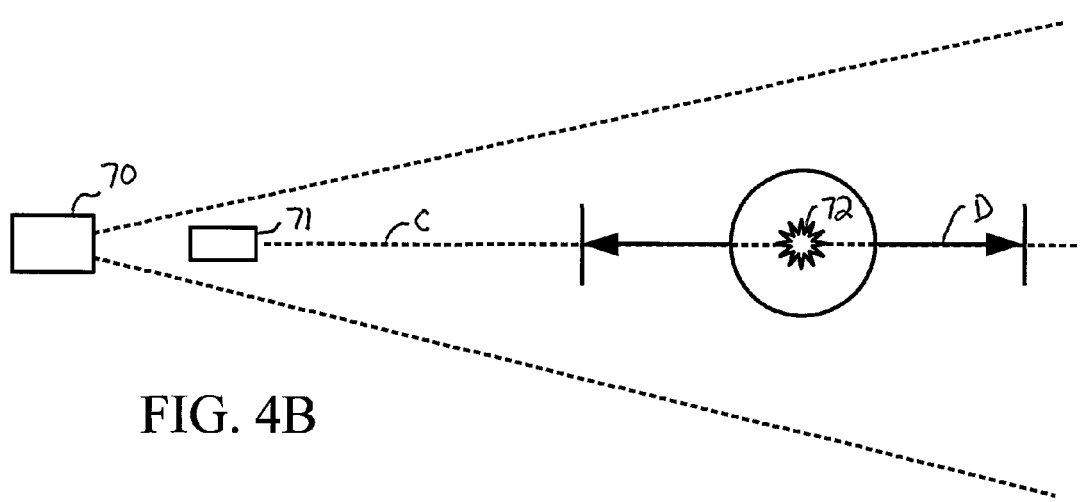

FIGS. 4A and 4B illustrates slew-to-cue functionality of the system which allows the camera to respond to a cue from information from another source, either internal or external to the system, such as another camera, radar, or other raw data intelligence source. The camera moves so as to become directed toward the target, and zooms while moving to focus on the target, or the area in which the target is expected to be. Slew-to-cue functionality is thus an initial step 30 in some embodiments of the process 10.

With reference first to FIG. 4A, slew-to-cue functionality uses on a PTZ camera 60 and another intelligence source 61, such as a fixed camera. The PTZ camera may be operated manually, such as by a joystick controlled by a operator. The PTZ camera may also may be be georeferenced. If it is georeferenced, then the system will be able to determine a size, velocity, and acceleration of an element 62, and thus be able to better correctly classify an object corresponding to the element 62 as a threat according to the process 10 as described above. Briefly, it is understood that the other intelligence source 61 may be something other than a camera, such as radar, sonar, or other intelligence sources. For purposes of clarity, however, the other intelligence source will simply be referred to herein as a fixed camera 61 to distinguish it from the PTZ camera 60. The fixed camera 61 has a field of view directed over a terrain space. The fixed camera 61 is geospatially aware of its own location and attitude, by virtue of GPS, manual setup, calibration, and determination, or something else. The fixed camera 61 identifies the target 62 and the geolocation of the target 62. The system classifies the target 62, such as as a vehicle, person, boat, or the like. The system alerts the PTZ camera 61 to slew to the location in which the target 62 is believed to be. The system, knowing the geolocation of the target and the location of the fixed camera, determines a line of sight or axis A between the fixed camera 61 and the target 62 and then determines an error range B surrounding that location along the axis A. Error within the error range B is much more likely along the axis A than laterally or through the angular field of view of the camera 61. The error range B is the uncertainty in the target's position along the axis A. The PTZ camera 60 is then slewed to, or moved and directed toward, the target's believed location and then searches, or sweeps, within the error range B along the axis A to locate the target 62. The PTZ camera 60 searches by conducting an initial sweep S, panning laterally along the axis A between the extent of the error range B. If the PTZ camera 60 locates the target 62, then the PTZ camera 60 locks onto and tracks the target 62 autonomously according to the process 10 described above. If, on the other hand, the PTZ camera 60 does not locate the target 62 in the initial sweep of the error range along the axis, then the PTZ camera 60 begins a sweep pattern. The sweep pattern first moves to a second sweep S', parallel to and just outside the initial sweep S, which extends laterally across the error range B, and which is spaced away from the initial sweep S by an amount generally equal to and slightly overlapping the depth of field of the PTZ camera 60. The second sweep S' is performed on both sides of the axis. Additional sweeps may be performed at the user's preferably preset discretion. Generally, three sweeps total are recommended, with one on each side of the axis A.

In some instances, the geometry between the fixed camera, the PTZ camera, and the target require different movement from PTZ camera to perform the sweep. For instance, where the fixed camera, the PTZ camera, and the target are aligned or nearly aligned, the PTZ camera will perform the sweep by tilting rather than panning. FIG. 4B illustrates such a situation, where the PTZ camera 70 is aligned with the fixed camera 71 along the axis C. In FIG. 4B, the PTZ camera 70 will tilt into and out of the page to look in front of and behind the potential location of ht target 72 in the error range D.

Figure 5:
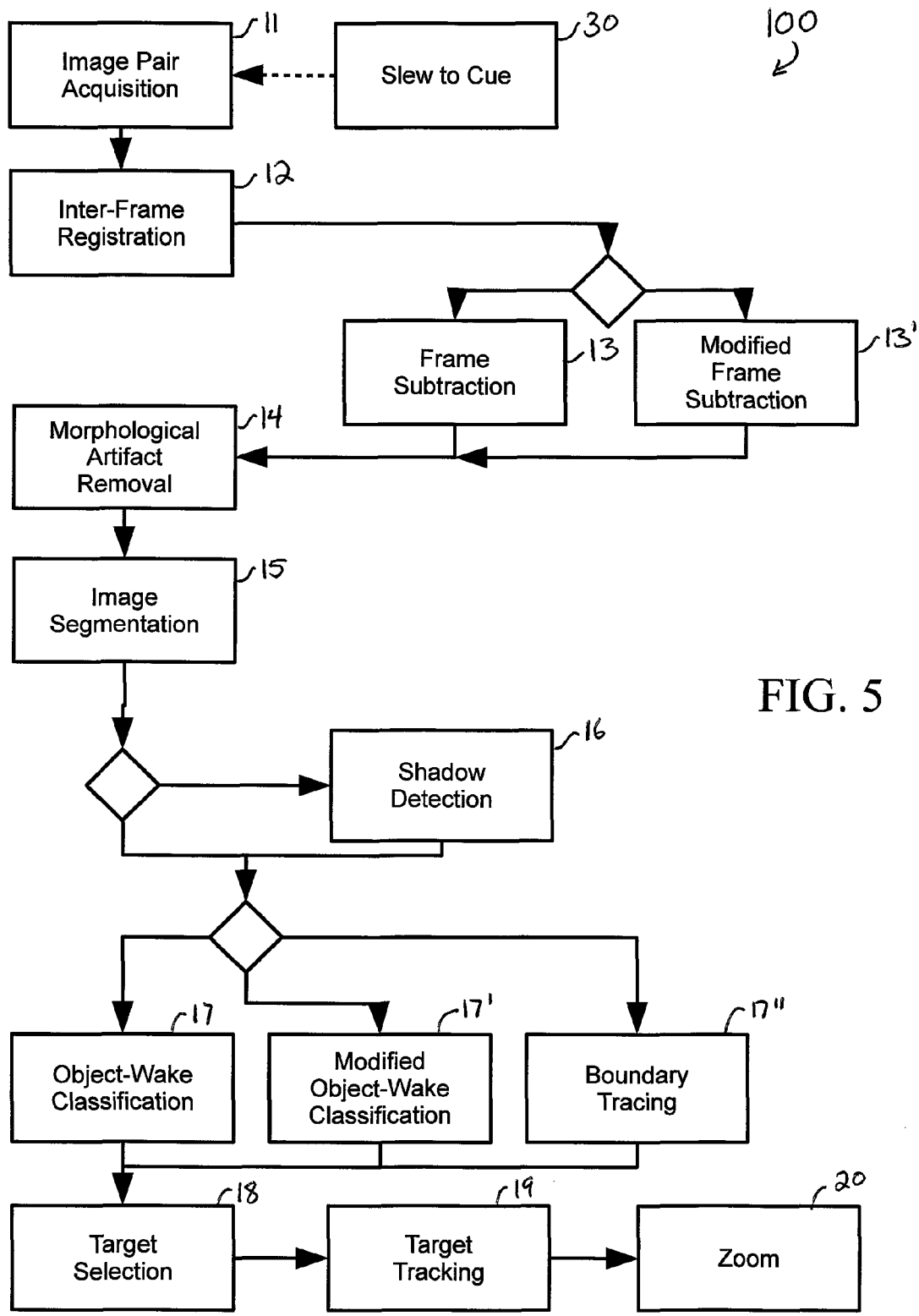
FIG. 5 is a flow diagram showing steps of an autonomous lock-on target tracking process with geo-spatial aware PTZ cameras according to the present invention.

In another embodiment of the present invention, identified generally as process 100 in FIG. 5, a modified object-wake classification scheme is used. The process 100 includes many of the steps of the process 10 shown in FIG. 10, and includes an additional, modified object-wake classification step 17' which presents an alternative to the object-wake classification step 17. As such, the process 100 includes all of the reference numerals of FIG. 1 for consistency. In the previously described object-wake classification step 17 of process 10, analysis relied on a divergence measure between a blob and a dilated form of the entire blob. In this modified object-wake classification step 17' of process 100, the analysis shifts the divergence measure from one which compares a blob and a dilated blob to one which compares a blob and its peripheral region resulting from dilation of the blob, hereinafter referred to as "periphery."

This modified scheme provides a more definitive divergence measure when the blob and its periphery cover dissimilar regions compared to when the blob and its periphery cover very similar or even homogeneous backgrounds, thus providing high confidence in the object-wake classification. The modified object-wake classification step 17' of process 100 also allows extraction of additional attribute information useful for identifying an object.

Figure 7A:
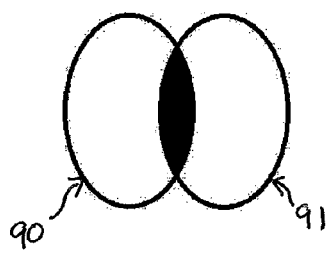
FIGS. 7A-7E are generalized diagrams illustrating a portion of the object-wake classification step of FIG. 6.
Figure 7B:

As before under process 10, the frame subtraction step 13 yields a resultant image consisting of blobs, and the morphological artifact removal operation of step 14 removes singular or small clusters or thin streaks of connected foreground pixels. Image segmentation then occurs in step 15, and shadow detection is optionally performed in step 16, as described above with respect to process 10. This yields a resultant image having one or several blobs, as shown in FIG. 7B. FIG. 7B illustrates an exemplary situation in which an object (here having an oval shape), has moved slightly, so that in FIG. 7A, the position of the blob in the first image (identified generally with reference character 90) and the second image (identified generally with reference character 91) are shown overlapped. FIG. 7B shows two blobs with a void disposed therebetween. The void is due to the overlap between the objects in the first and second images.

Figure 6:
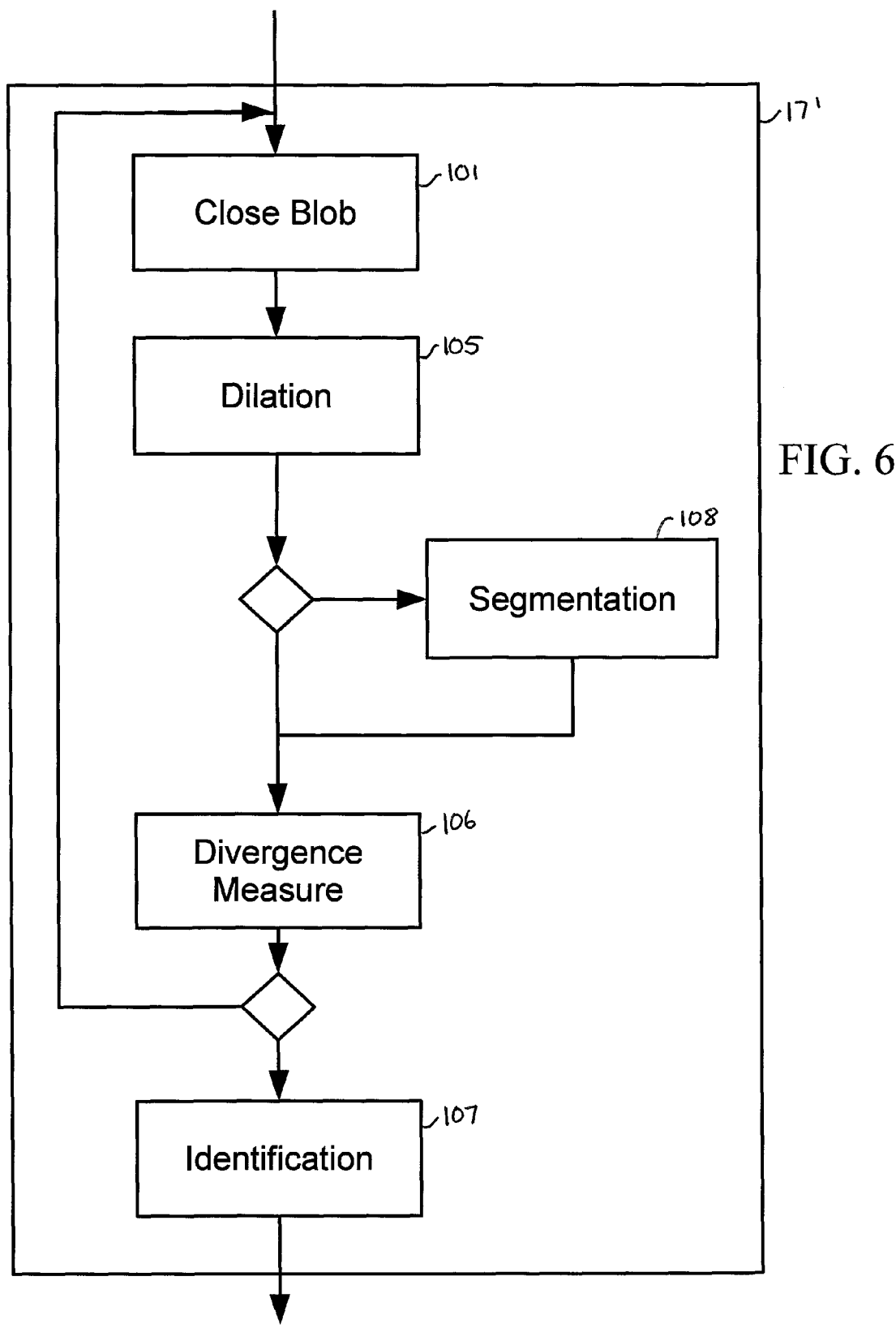
FIG. 6 is a detailed view of an object-wake classification step of the flow diagram of FIG. 5.
Figure 7C:
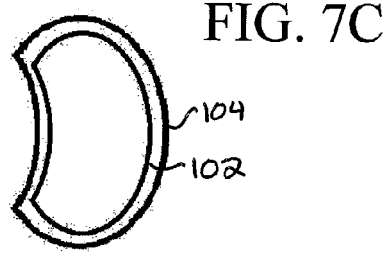

The modified object-wake classification step 17' then begins after the shadow detection step 16. FIG. 6 illustrates a flow diagram showing internal steps within step 17'. Within step 17', the first step 101 is that of locating a close blob in the resultant image. The close blob is first located according to conventional means. FIG. 7B indicates that the right blob 102 is the close blob 102 as its centroid is closest to the center 103 of the image. According to step 105 of FIG. 6, the close blob 102 is then dilated to form a periphery 104 of the close blob 102, as shown in FIG. 7C. The term "periphery" 104 refers only to that strip or band of pixels dilated outside of the blob 102. The extent of the dilation is dependent upon both the compactness and the size of the blob 102. More compact blobs will claim a comparatively shorter perimeter with respect to their area than elongated blobs will. Since our divergence-based dissimilarity measure rests on pixels' intensity probability distribution of the underlying image regions spanned by the blob and its periphery, an approximately balanced number of contributing pixels in those regions would help the reliability and sensitivity of such divergence measure; it is preferable that the number of pixels spanned by the blob be comparable to the number of pixels spanned by the periphery. Hence, a measure such as the blob area weighted by its compactness is used to establish the periphery area and hence the extent of dilation. Compactness is defined as the ratio of area to perimeter-squared. Size is defined as the size, or area, of the blob.

Figure 7D:
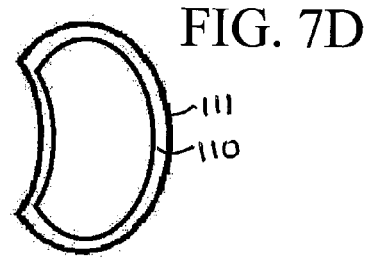

Certain pixels in areas of the second image are analyzed and their grayscale values are compared. More specifically, and with respect to FIG. 7D which shows the second image, pixels in the second image which correspond in location to the pixels that make up the close blob 102 in the resultant image are determined and identified as "current blob pixels" 110 of the second image. Likewise, pixels in the second image which correspond in location to the pixels that make up the area of the periphery 104 in the resultant image are determined and identified as "current periphery pixels" 111 of the second image in FIG. 7D. Notably, as defined above, the periphery 104 does not include all pixels bound by the line marked with reference character 104; the periphery 104 includes only those pixels bound between the line marked with reference character 104 and the line marked with reference character 102. Thus, the periphery 104 does not include the pixels in the blob 102. Correspondingly, the current periphery pixels 111 include only those pixels in the second image which are bound between the lines marked with the reference characters 110 and 111 in FIG. 7D. For ease of explanation, the region bound by line 110 may be referred to herein with the reference character 110, and similarly, the region bound by line 11 may be referred to herein with the reference character 111. Because the current blob pixels 110 and the current periphery pixels 111 exist in the second image of the image pair, the current blob pixels 110 and the current periphery pixels 111 have grayscale values.

Divergence measures are then taken and compared for the first and second images, as in step 106 in FIG. 6. A first dissimilarity comparison is performed by using the divergence of the grayscale of the current blob pixels 110 and the current periphery pixels 111, yielding what is referred to herein as a "current divergence measure."

Figure 7E:
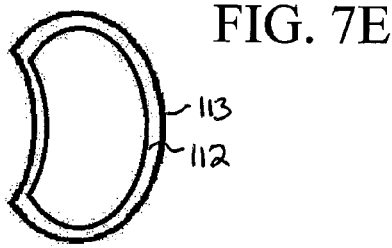

A "prior divergence measure" is determined to be compared with this current divergence measure. This prior divergence measure is determined from an analysis of the pixels in the first image. Certain pixels in areas of the first image are analyzed and their grayscale values are compared. More specifically, pixels in the first image which correspond in location to the pixels that make up the close blob 102 in the resultant image are determined and identified as "prior blob pixels" 112 of the first image in FIG. 7E. Likewise, pixels in the first image which correspond in location to the pixels that make up the area of the periphery 104 in the resultant image are determined and identified as "prior periphery pixels" 113 of the first image in FIG. 7E. As similar to above, the prior periphery pixels 113 include only those pixels in the first image which are between the lines marked with the reference characters 112 and 113 in FIG. 7E. Because the prior blob pixels 112 and the prior periphery pixels 113 exist in the first image of the image pair, the prior blob pixels 112 and the prior periphery pixels 113 have grayscale values.

A second dissimilarity comparison is performed by using the divergence of the grayscale of the prior blob pixels 112 and the prior periphery pixels 113, yielding the prior divergence measure, still in step 106 of FIG. 6. If the current divergence measure is greater than the prior divergence measure, then the blob in the second image is identified as the object and the process 100 proceeds to the identification step 107 of FIG. 6. Otherwise, the blob in the second image is identified as the wake, and the process returns to step 101 to locate the next closest blob and repeat the remaining steps of the modified object-wake classification step 17' in FIG. 6. Essentially, step 17' includes a feedback loop for determining the next closest blob which will be tested for potential classification as the object.

Once the object is determined from the step 107, the corresponding object blob and its periphery are processed to identify the object, as shown in step 107, to determine whether the object is an object of interest, or, in other words, a target. A clipping operation is performed on the second image.

The clipping operation proceeds according to the following steps:

1. The mean of the intensities of the current blob pixels 110, as defined above, is determined and referred to herein as a "current blob mean."
2. The median of the intensities of the current periphery pixels 111, as defined above, is determined and referred to herein as a "current periphery median."
3. A lower hinge, or first quartile, of the current periphery pixels 111 is determined and referred to herein as a "current periphery lower hinge." The current periphery lower hinge is calculated as the median between a minimum and the current periphery median.
4. An upper hinge, or third quartile, of the current periphery pixels 111 is determined and referred to herein as a "current periphery upper hinge." The current periphery lower hinge is calculated as the median between a maximum and the current periphery median.
5. Apply a clip-low operation on the current blob pixels 110 and the current periphery pixels 111 in the current image if the distance between the current periphery lower hinge and the current blob mean is greater than the distance between the current periphery upper hinge and the current blob mean by suppressing (i.e., setting to zero or a user-defined value) all pixels with intensities less than the mean of the periphery. Conversely, apply a clip-high operation on the current blob pixels 110 and the current periphery pixels 111 in the current image if the distance between the current periphery lower hinge and the current blob mean in the current image is less than the distance between the current periphery upper hinge and the current blob mean by suppressing (i.e., setting to zero or user-defined value) all pixels with intensities greater than the mean of the periphery.

In some cases, such as where the camera is recording at very high frame rates and the supporting computer system is able to process at very high speeds, it is likely that the current periphery pixels 111 will overlap on pixels corresponding to the actual object, as a faster frame rate will record image pairs closer in time and thus will record smaller movements and smaller changes in position. In short, the frame subtraction step 13 and, in turn, the image segmentation step 15 of FIG. 5 will yield partially-obscured object and wake blobs disguised as background. A segmentation of the periphery (as shown in step 108 of FIG. 6) prior to the divergence measure step 106 is helpful.

If, in the case of an overlapped object and wake, the segmentation step 108 is not undertaken, misclassification of the object is possible. The periphery is segmented by: (i) computing a threshold that best partitions the histogram of intensities of the periphery in the underlying image pair into two ranges, one range below and one range above the threshold, via the following known relation, which is a well-known and conventional entropic thresholding method, namely, only equation (21) below:

$$T = _{t\varepsilon 0 \ldots L-1}^{Argmin}[\Sigma_{i=0}^{t} p_i \log_2 p_i + p_{i=t+1}^{L-1} p_i \log_2 p_i] \quad (21),$$

where L signifies the range of intensities, T is the sought threshold, and $p_i$ is the frequency of occurrence of intensity i normalized by the population of pixels considered.

Then, (ii) finding medians both below and above the thus determined threshold T, in equation (21), in the histogram of the area spanned by the entire periphery in the second image. Finally, (iii) if the medians differ by more than a user-defined percentage of mean of pixel intensity differences of the area spanned by the close blob in the first and second images, then the periphery is segmented. Once segmented, the divergence is measured between the areas spanned by the blob and the two periphery segments in the second and first images. Ultimately, divergence is a useful metric for classifying the blob as either object or wake.

With respect to the second image initially, a divergence measure is determined between the pixels spanned by each of the segmented peripheries and the blob, so as to ignore the periphery which yields a lower divergence, so that high divergence indicates a higher likelihood of the blob being the object. This high divergence is noted for use in the below step.

Then, with respect to the first image, a divergence measure is determined between the pixels spanned by each of the segmented peripheries and the blob. If that divergence measure is greater than the previously-noted high divergence from the second image, then this indicates a higher likelihood of the blob being the wake.

When there is overlap, the confidence of the object-wake classification step 17' is lessened such that misclassification is likely, especially if the extent of overlap is considerable; therefore, segmenting the periphery 104 before the divergence measure step 106 provides a more definite result, and a more confident classification. In other words, an unpartitioned periphery in the event of overlap would render object-wake classification unreliable, particularly if the overlapped area is large compared with the rest of the periphery.

In yet another embodiment of the present invention, a "guided boundary tracing method" is employed. Step 17" in FIG. 5 illustrates boundary tracing in process 100. Boundary tracing is an alternative approach to the object-wake classification steps 17 and 17'. The method is "fully-guided" in the case of non-overlapped object and wake blobs and "partially-guided" in the case of overlapped object and wake blobs. In this alternative approach of step 17", which is shown in greater detail in FIG. 10, after locating the closest blob to the image center (as in step 130 in FIG. 10), object-wake classification is achieved through counting boundary points in each of the first and second images according to a sufficient gradient magnitude (as in step 131 in FIG. 10). A gradient magnitude above a user-defined threshold qualifies a pixel to be defined as a boundary point. Then, according to step 132 in FIG. 10, if the first image exhibits a greater number of boundary points than the second image, then the blob is classified as wake and the next closest blob to the image center is sought and the process is repeated at step 130. Otherwise, i.e. when the current image exhibits a larger number of boundary points at those blob boundary points, the blob is classified as the object and step 133 of FIG. 10, i.e. object identification is entered. In short, this embodiment avoids the need for the divergence measure step 106 of FIG. 6.

As an aside, more than one criterion can be imposed for qualifying a point as boundary point in the underlying first and second images of the image pair. In one option, only the gradient magnitude at blob boundary points are measured in the first and second images to identify the greater. A different criterion is based on demanding that each boundary point also be accompanied by two neighboring points with a gradient direction close to that of the boundary point with lower gradient magnitude and gradient directions that do not deviate from that of the boundary point by more than a user-defined extent. The gradient magnitude and orientation are obtained through convolution of the underlying image pair with known Sobel kernel.

Figure 11:
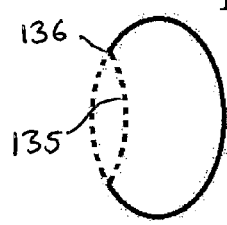
FIG. 11 is a generalized diagram illustrating another portion of the boundary tracing step of FIG. 5.

As illustrated in FIG. 11, it is noteworthy that revealed blob boundaries in cases of overlapped object and wake, part 135 of the blob boundary would be fictitious and lack gradient. In such cases, the object boundary cannot be closed by merely tracing the blob boundary as revealed by the segmentation process. Further in such cases, the comparison of the number of boundary points as defined above shall dictate the outcome of such classification. In other words, if the second image exhibits a greater number of such boundary points then the close blob is the object; otherwise the second image is classified as the wake.

Figure 10:
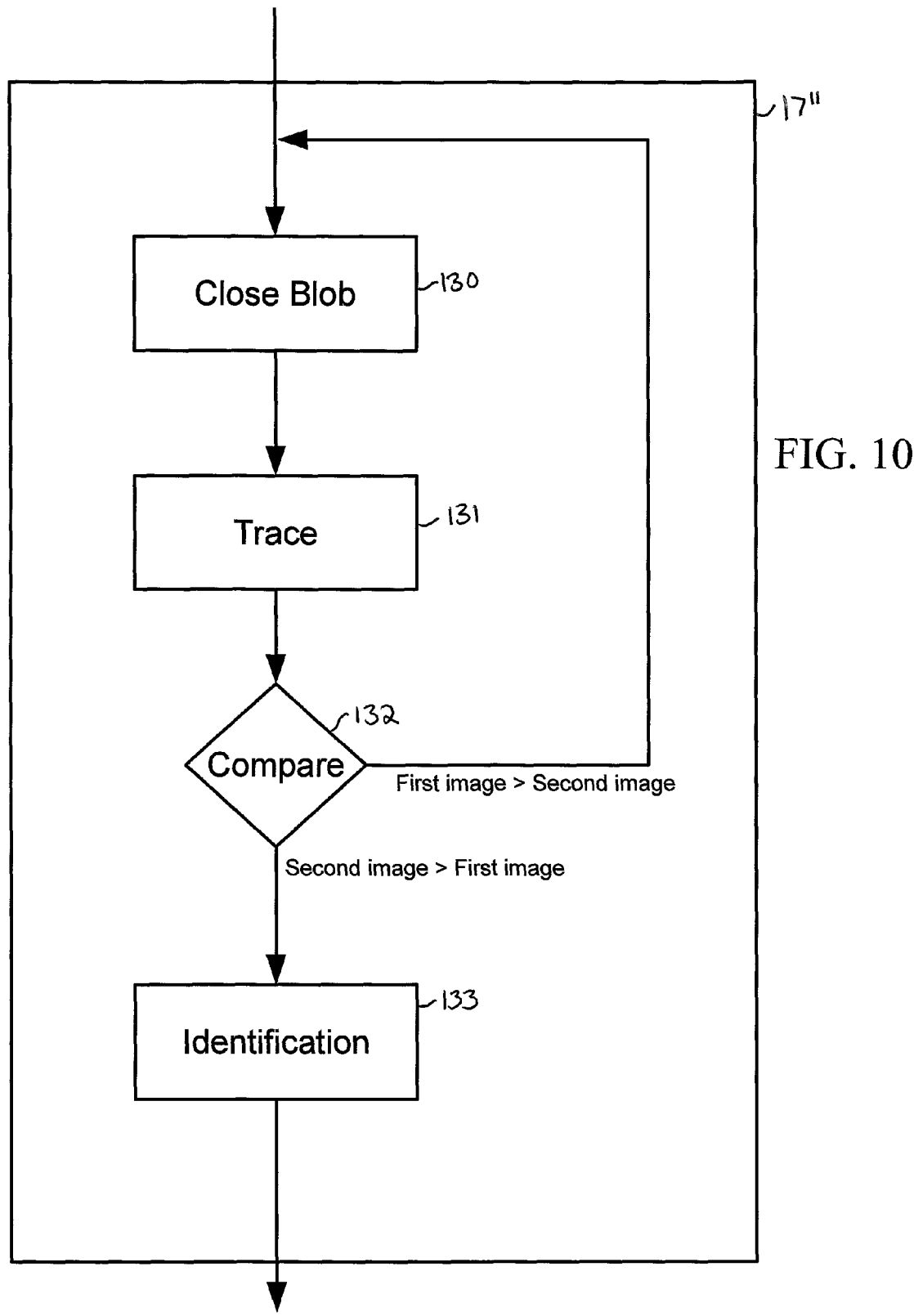
FIG. 10 is a detailed view of the boundary tracing step of FIGS. 5 and 9.

In the identification step 133 of FIG. 10, for overlapped object-wake situations, the object boundary is traced along the closed blob boundary to the extent of satisfying the aforementioned gradient-related criteria. Up to a point (identified with the reference character 136 in FIG. 11 for example), however, where the apparent blob boundary no longer exhibits gradient magnitude along the object in the second image, then, the next boundary point is located point-by-point until a closed boundary results. Object identification as shown in step 133 of FIG. 10 recovers the entire boundary in order to avoid "tracing" an erroneous blob boundary, by tracing the boundary sequentially with the aim of securing a closed boundary. Once a closed object boundary is detected then the various attributes of the object's spatial and appearance related attribute are revealed, which, in turn, can assist in target identification.

Since this extension of the object boundary is contingent on the gradient magnitude surpassing a user-defined threshold as well as user-defined tolerable deviation in gradient direction between central neighboring pixels, it is possible that those user-defined thresholds are, at times, excessive. In such an event, the unclosed boundary is closed by a direct or linear connection of terminal points of the boundary or alternatively, by drawing a bounding box for the object boundary thus far found.

Referring again to FIG. 5, process 100 includes an additional alternative step modified from process 10 of FIG. 1. Specifically, a "modified frame subtraction" step 13' presents an alternative to the frame subtraction step 13. This modified frame subtraction step 13' includes the derivation of another binary image, hereinafter referred to as a "sign map." The modified frame subtraction step 13' yields two outputs: the binary resultant image that has been described throughout this disclosure, and this sign map which will now be described. The sign-map has utility in all embodiments of the invention, including object-wake classification with isolated object and wake blobs, object-wake classification with overlapped object and wake, regardless of whether a divergence measure is determined from a comparison of the blob and the dilated blob or from the blob and its periphery, or finally, object-wake classification is done through boundary tracing.

Figure 8:
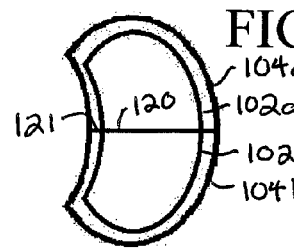
FIG. 8 is a generalized diagram illustrating a portion of the object-wake classification step of FIG. 6 under a modified frame subtraction step of FIG. 5 utilizing a sign map.

Sign-map plays an especially helpful role in object-wake classification and the subsequent object identification when pixels within the revealed blobs exhibit a relative value, or different polarity. Polarity difference comes about when pixels in one of the first and second images of the image pair are not consistently higher or lower than corresponding pixels in the other of the first and second images, but they are higher in one region and lower in another region of the blob, as depicted in FIG. 8. The pixels of the sign map which correspond to the blob 102 in the resultant image have content or value corresponding to the relative values of respective pixels in the first and second images. More specifically, each pixel of the sign map which corresponds to the blob 102 in the resultant image identifies whether the content of the respective pixel in the second image is greater than or lesser than the content of the respective pixel in the first image. The sign map thus provides polarity information of the second image relative to the first image. The sign map is helpful in determining a spatial extent and appearance of the target, and also in identifying and distinguishing the target from other objects which may be present in the field of view.

The below description discloses first how the sign-map enhances each of the object-wake classification steps 17 and 17' for the dilation-related cases (i.e. through divergence measures of a blob and its periphery) when, for example, the moving person or vehicle object exhibits more than a single distinct range of gray-tone or alternatively the background displays such characteristics. In such instances the sign-map is leveraged to guide partitioning of the blob. First, the blob is partitioned into homogeneous regions of pixels having the same polarity and then the divergence measure is determined between thus derived homogeneous regions of pixels having the same polarity and their respective peripheries in the first and second images. FIG. 8 depicts an example arising from a human target exhibiting lighter upper body and darker lower body with respect to the background.

The blob 102 is partitioned into homogeneous regions of pixels having the same polarity, as shown in FIG. 8, where the blob 102 is partitioned into regions 102a and 102b. For instance, where the actual object is a person wearing dark pants and a light shirt and walking horizontally through the field of view, there may be upper and lower homogeneous regions of pixels having the same polarity with a roughly horizontal boundary between the upper and lower regions. A boundary 120 is identified in the blob 102 between the homogeneous regions of pixels having the same polarity. Likewise a boundary 121 is identified in the periphery 104 between homogeneous regions 104a and 104b of pixels having the same polarity; the boundary 120 in the blob 102 is extended proximally through the periphery 104, so that the boundary 121 in the periphery 104 does not extend far from the boundary 120 in the blob 102. Object-wake classification similar to steps 17 or 17' may occur as described above, but with the modification that instead of determining divergence measures for the entire blob 102, the divergence measures are calculated for the partitioned regions 102a and 102b of the blob. Further, instead of determining divergence measures for the entire periphery 104, the divergence measures are calculated for the partitioned regions 104a and 104b of the periphery.

Figure 9:
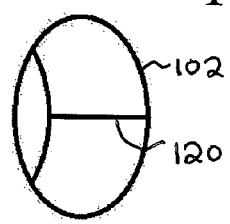
FIG. 9 is a generalized diagram illustrating a portion of a boundary tracing step of FIG. 5.

The sign map is also useful to aid in determining the pixels which are actually spanned by the object by determining an outer boundary of the object during the boundary tracing step 17". The sign map is processed so as to locate an internal boundary 120 of the blob 102, as shown in FIG. 9. The internal boundary 120 is defined between homogeneous regions of pixels having the same polarity. When an internal boundary 120 is defined and known, it is then ignored (or avoided) while the boundary tracing step 17" is performed to determine the scope of the pixels of the object. Were the internal boundaries not known from the sign map, then during the boundary tracing operation, the outer boundary of the object could be incorrectly drawn into an internal portion of the object along one of the internal boundaries of the blob 102. Hence, the sign map is useful when pursuing not only object-wake classification but also object identification via boundary tracing to the extent of locating and identifying the internal boundary 120 of the blob 102. It is noted that there may be one, several, or no internal boundaries in the blob 102. The sign map step 13' is useful when there is one or several internal boundaries; when there are no internal boundaries, the sign map 13' presents no deleterious consequences.

Figure 12:
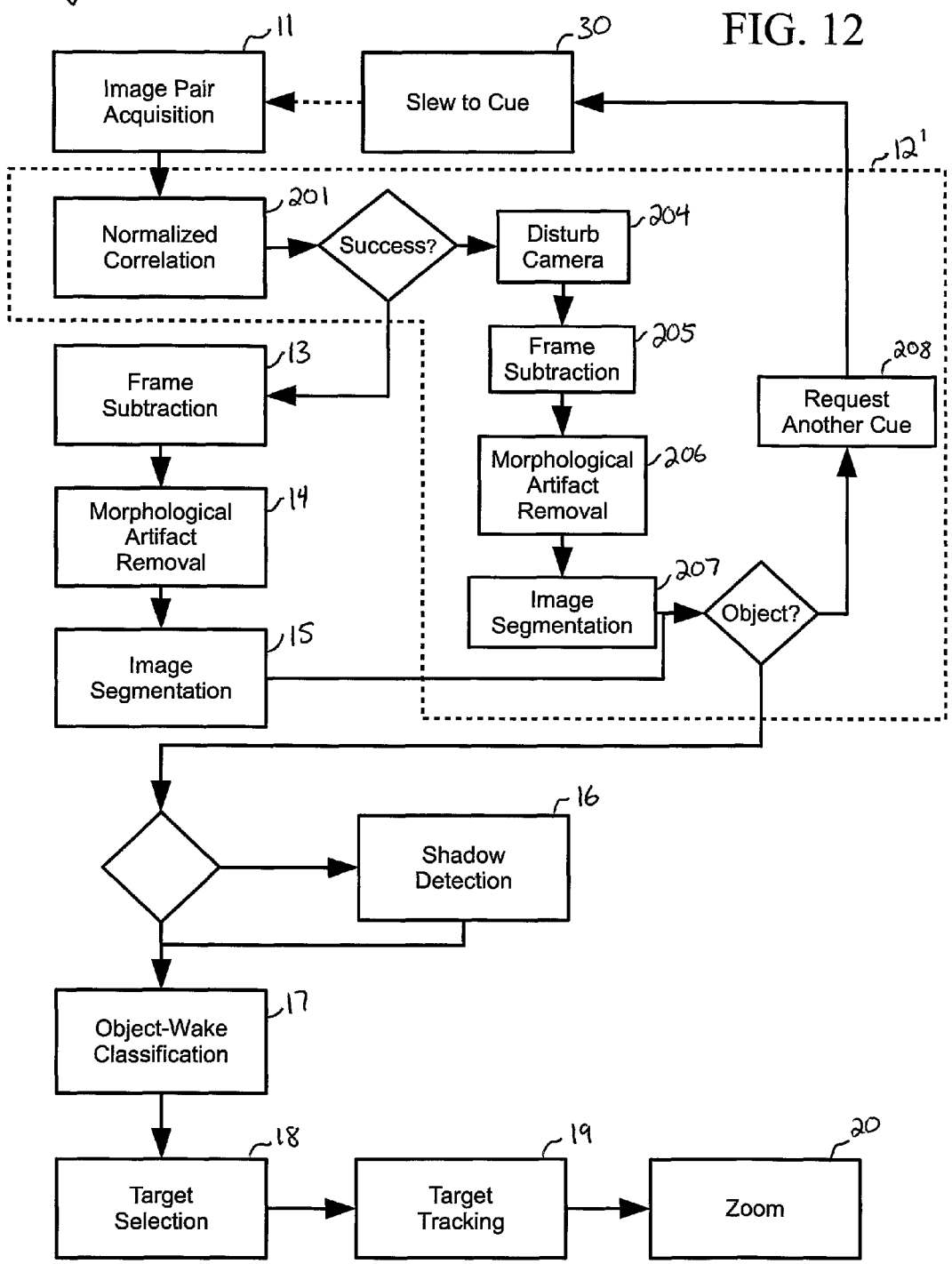
FIG. 12 is a flow diagram showing steps of an autonomous lock-on target tracking process with geo-spatial aware PTZ cameras for aerial targets, according to the present invention.

In yet another embodiment of the invention, illustrated in FIG. 12, a process 200 for imaging, analyzing, and tracking an object through aerial space (defined as space above land or water for which, when a camera images the aerial space, land or water is not visible, or is substantially not visible such that it does not substantially overlie the object to be tracked), or over water or terrain, involves a system including imaging means, such as a PTZ video camera capable of panning, tilting, and zooming through the aerial space from a location, regardless of whether that location is based on land, water, or in the air as well. In some embodiments, the imaging means is a video camera, or a lidar, radar, sonar, thermal, phase array, ultrasound or sonogram imaging means, or other real imaging means that includes a physical device for capturing information about real space. The system and process 200 are useful for tracking a cued aerial target, such as an unmanned aerial vehicle, aerostat, helicopter, aircraft, missile, bird, or other similar airborne object from a stationary PTZ camera, or a PTZ camera mounted on a land vehicle, a waterborne vessel or platform, or manned or unmanned aerial vehicles. The PTZ camera has slew-to-cue functionality, as previously described, so that the PTZ camera slews to the target and then embarks on autonomous tracking. This tracking occurs by maintaining the target, which could be maneuvering unpredictably, at or proximate to the center of the field of view in a sequence of images. The PTZ camera continuously corrects its pan, tilt, and zoom functionalities in response to instructions from the system, so as to maintain the target at or close to the center.

Referring now to FIG. 12, when a cue source, such as another camera, search radar, a guard, or the like cues the system to direct the camera toward a potential target, it provides sufficiently enabling geolocated or georeferenced information that the system is able to determine the bearing, elevation, and range with respect to the target. The camera slews to this cue (step 30) by elevating, training, and zooming correspondingly as described above. Together with an a priori notion—an assumption about the size, shape, bearing, and other characteristics of the object for which the system is monitoring—about the type of target, the PTZ camera trains, elevates, and adjusts its zoom level to image the target through desired pixel bounds. For example, while a missile imaged by a camera might typically seem to be of interest, its bearing through the image to the side of the image would indicate that it is not travelling at the camera and thus can likely be disregarded; an a priori notion that the system is only concerned with incoming objects would filter a missile like this. Or, as another example, a human manually operating a joystick will inherently set the correct zoom when viewing the image so as to achieve a desired pixels on target. In other words, the PTZ camera settings are adjusted to maintain a desired number of pixels on target such that the target can be adequately imaged and sized with respect to the field of view. When the cue source is a human-operated joystick, such as may occur where a guard or operator is tasked to watch an area of interest with a remote and manually controlled camera, the cue is expected to inherently include not only the bearing and elevation of the target, but also information on the extent of adjustment in zoom level necessary to image the aerial target through the a priori-established pixel bounds. Tracking of the target through a manual cue is autonomous after it is initially acquired. An image pair is acquired (step 11) as described above with respect to other embodiments of the method.

The first two steps 30 and 11 of the process 200 are identical to those of the processes 10 and 100. Indeed, the process 200 proceeds according to most of the operational steps described above and in U.S. Pat. Nos. 9,213,904, and 9,367,748, issued Dec. 15, 2015, and Jun. 14, 2016, respectively, to which this application claims priority and which are hereby incorporated by reference. However, the inter-frame registration 12 of the processes 10 and 100 is modified in the process 200, and is identified as a modified registration step 12' in FIG. 12 (shown in broken line around several encompassed procedural steps). After this modified registration step 12', the remaining steps of the other processes 10 and 100 remain the same for this process 200. This is shown in FIG. 12, in which the steps 13-20 all bear the same reference characters as those used in processes 10 and 100.

Figure 13:
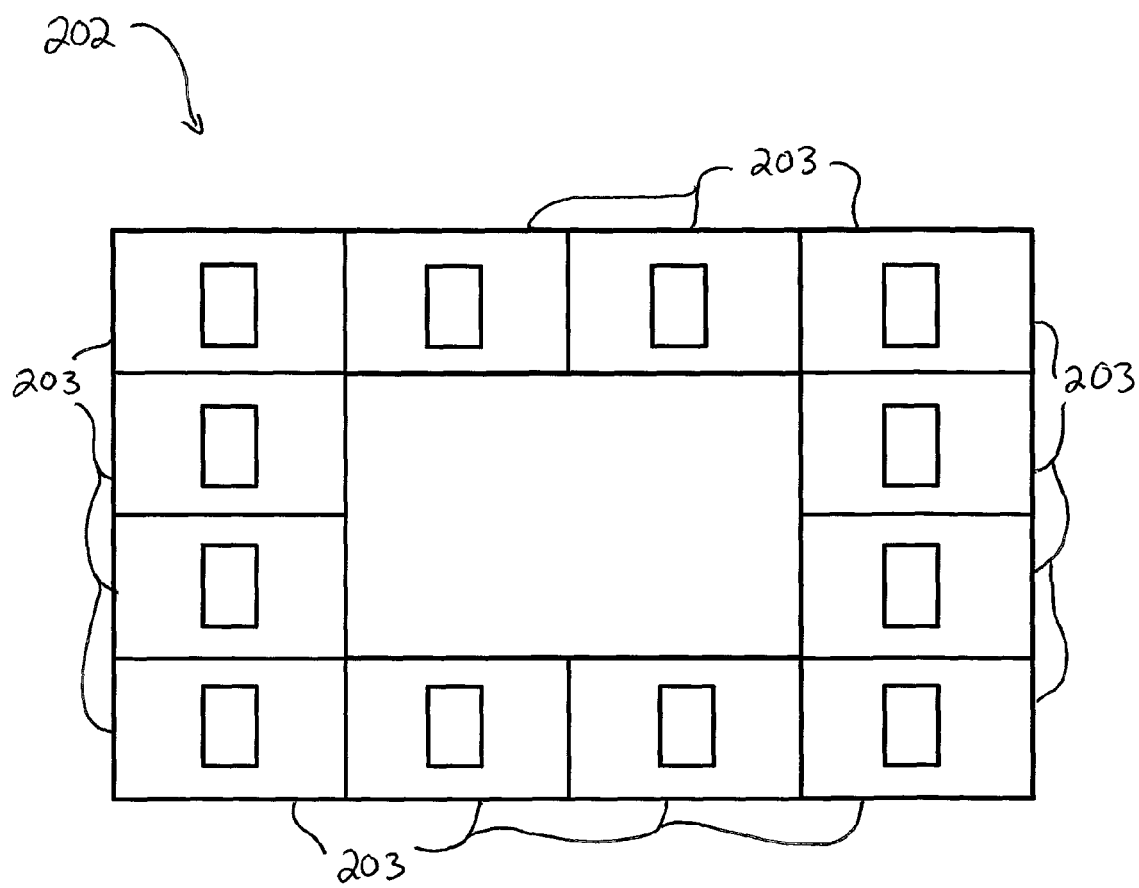
FIG. 13 is generalized schematic illustrating peripheral blocks in a field of view, as useful in the process of FIG. 12.

Inter-frame registration is handled differently in this embodiment of the process 200 because of the possibility that the background of the scene, when tracking an aerial target, may be a clear sky and thus uniform, homogenous, featureless, or void of peripheral features. In the previous embodiments, the step of inter-frame registration 12 would conclude and allow the later operational steps 13-20 to reveal and track the target. However, a different step is needed because of this "blue sky" problem. It should be noted, however, that the problem arises not just in the context of a blue sky, but also where the aerial background appears as substantially homogenous, uniform, featureless, or otherwise lacking in appreciable or sufficiently detectable detail. For instance, a drone flying above a fine sand desert will image a target below it with an essentially uniform background; the sand may appear to lack any features. As another example, a waterborne vessel may image a target against a backdrop of a smooth ocean; where the sea state is very calm and quiet, the ocean will appear to be featureless and uniform. Similarly, a target in an arctic environment may appear to be on completely homogenous, white background. The analysis for the modified registration step 12' begins with a normalized correlation step 201. Referring briefly to FIG. 13, a field of view 202 is shown which is divided into blocks 203. Normalized correlation is sought between at least two corresponding blocks in an image pair which are not adjacent to each other, which exhibit a correlation peak above a minimum (and generally user-defined) threshold, and for which the normalized correlation function shows at least some minimal degree of peakedness (i.e., a departure from being flat). FIG. 13 was first presented in U.S. Provisional Application No. 61/793,891, filed Mar. 15, 2013, to which this application claims priority and which is hereby incorporated by reference.

If the normalized correlation step 201 succeeds, then the process 200 exits the modified registration step 12' and proceeds to the frame subtraction step 13 and remaining steps 14-20 as described above with respect to the already-described processes 10 and 100. If, however, normalized correlation fails, it likely does so because the sky is uniform or homogenous. Such a scenario could occur if the sky were entirely blue or filled entirely with a featureless cloud, for example. One of two methods are thus implemented to nevertheless attempt to detect an object.

Under a first method, the PTZ camera is disturbed vertically or horizontally very slightly (step 204). This creates a shift between images in the image pair. After the disturbance, the subsequent image processing steps are carried out to determine whether an object is revealed (steps 205-207). If so, the camera is panned and tilted with angular velocities corresponding to and commensurate with the deviation of the centroid of the object (as discussed above) from the center of the image, and the process 200 continues according to the steps following step 15, as in other processes 10 and 100.

Under a second method, other steps such intra-frame segmentation (as discussed above with thresholding of bimodal histograms of the entire image) are performed to reveal the object, and correction is applied to the camera accordingly.

If the above two methods fail to reveal an object, then the system determines that there is no object in the field of view; either there was never an object because the cue was wrong, or there was an object and the cue was wrong, or there was an object and the camera moved, positioned, or zoomed without accuracy or timeliness. Regardless, the system requests another cue (step 208). The above steps occur very rapidly, within perhaps 1-3 seconds, a duration which is limited by the hardware capabilities.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. A computer-implemented surveillance method for tracking a target in a featureless background, the method comprising the steps of:
   providing a real imaging means forming a pair of first and second images of a real space in a field of view of the imaging means, the field of view having a center;
   storing the pair of first and second images in non-transitory memory;
   performing, with a processor, a correlation operation on the pair of first and second images for forming a resultant image including blobs corresponding to elements in the real space and then storing the resultant image in the non-transitory memory;
   classifying one of the blobs as the object, comprising the steps of:
   identifying a first blob and a corresponding second blob in the resultant image;
   determining a first set of pixels in the second image which correspond to the first blob in the resultant image;
   determining a second set of pixels in the second image which correspond to the second blob in the resultant image;
   dilating both the first and second set of pixels in the second image to form a dilated first set of pixels and a dilated second set of pixels in the second image;
   measuring a first divergence between the first set of pixels and the dilated first set of pixels;
   measuring a second divergence between the second set of pixels and the dilated second set of pixels;
   classifying the first blob as the object if the first divergence is greater than the second divergence; and
   classifying the second blob as the object if the second divergence is greater than the first divergence;
   tracking the object by moving the imaging means toward the object by an amount corresponding to the distance between the center of the field of view and a center of the object; and
   continually repeating the step of tracking as the element corresponding to the object moves in the real space.

2. The method of claim 1, wherein the step of performing a correlation operation further comprises performing a normalizing correlation on the pair of first and second images and rejecting the pair of first and second images if the normalizing correlation does not exhibit a correlation peak above a minimum.

3. The method of claim 2, wherein the step of performing a correlation operation further comprises, in response to the rejecting the pair of first and second images:
   disturbing an orientation of the camera; and
   performing a frame differencing operation on the pair of first and second images to form the resultant image.

4. The method of claim 1, wherein the step of classifying comprises:
   each of the blobs having a respective centroid;
   determining distances between the center of the field of view and each of the centroids of the blobs;
   identifying a close blob from the distances between the center of the field of view and each of the centroids of the blobs; and
   classifying the close blob as the object.

* * * * *